US005787070A

United States Patent [19]
Gupta et al.

[11] Patent Number: 5,787,070
[45] Date of Patent: Jul. 28, 1998

[54] ONE FOR N REDUNDANCY IN A COMMUNICATION SYSTEM

[75] Inventors: Amar Gupta, Cupertino; Joel Craig Naumann, Morgan Hill; Shirish K. Sathe, Cupertino; Mohammad Seyed Nikuie, Mountain View, all of Calif.

[73] Assignee: Cisco Technology, Inc., San Jose, Calif.

[21] Appl. No.: 492,961

[22] Filed: Jun. 21, 1995

[51] Int. Cl.⁶ .................................................. H04L 1/22
[52] U.S. Cl. ...................... 370/217; 370/227; 395/182.05
[58] Field of Search .......................... 455/8; 375/260; 340/825.1; 370/216, 217, 221, 225, 226, 227, 228, 222, 223; 371/68.1, 68.2, 10.2; 395/181, 182.02, 182.03, 182.05

[56] References Cited

U.S. PATENT DOCUMENTS

| 4,234,956 | 11/1980 | Adderly et al. | 455/8 |
|---|---|---|---|
| 4,680,776 | 7/1987 | Ikeuchi et al. | 370/228 |
| 4,837,760 | 6/1989 | Reid et al. | 370/225 |
| 4,967,406 | 10/1990 | Yagi et al. | 370/228 |
| 5,329,521 | 7/1994 | Walsh et al. | 370/225 |

*Primary Examiner*—Benedict V. Safourek
*Attorney, Agent, or Firm*—Blakely, Sokoloff, Taylor & Zafman LLP

[57] ABSTRACT

A communication controller is disclosed with a plurality of service modules including a redundant service module and with a mechanism for substituting the redundant service module for any one of the service modules. The communication controller includes a redundancy module that distributes communication signals to the redundant service module via a distribution bus coupled to the service modules. The distribution bus is alternatively used to distribute a high speed communication link to the service modules for improved physical connectivity.

14 Claims, 6 Drawing Sheets

Figure 6

ONE FOR N REDUNDANCY IN A COMMUNICATION SYSTEM

FIELD OF THE INVENTION

The present invention pertains to the field of digital communications. More particularly, this invention relates to a redundancy mechanism and distribution mechanism for a communication controller.

BACKGROUND

Packet switching or cell switching communication networks such as asynchronous transfer mode communication networks are commonly employed to transfer digital information, over long distances. An asynchronous transfer mode communication network enables the transfer of digital voice information, digital video information and digital data over short or long distances via common carrier communication links. Such a communication network enables a wide variety of communication devices to share common carrier communication links on a demand driven basis.

A typical wide area asynchronous transfer mode communication network can be viewed as comprising an access switching node and a service access multiplexer that multiplexes a variety of lower speed services to a single higher speed interface towards the access switch. The communication links employed in communication networks towards service access typically include communication links such as T1 communication links. A typical T1 communication link provides a maximum data rate of 1.544 megabits per second. The E1 common carrier communication links available in Europe provide a maximum data rate of 2.048 megabits per second.

In addition, the communication links employed in such asynchronous transfer mode communication networks between the service access multiplexer and the access switches usually include higher speed communication links such as T3 or OC3 communication links which provide a maximum data rate of 45 megabits per second (or 155 Mbps for OC3 ). An example of a high speed common carrier communication link available in Europe is the E3 communication link, which provides a maximum data rate of 34 megabits per second.

A typical wide-area asynchronous transfer mode communication network is comprised of a set of cell switching communication controllers coupled for communication over such common carrier communication links. The topology of such a network typically requires that one or more of the communication networks perform high speed tandem switching among high speed communication links such as T3 or E3 links. A communication controller typically performs tandem switching by receiving a communication cell over one communication link and transmitting the communication cell over another communication link to route the cell to the proper destination in the network.

In such prior networks, the communication controllers that perform tandem switching may also be coupled to various types of customer premises equipment. Such customer premises equipment may include, for example, relatively low speed circuit switching communication devices such as private branch exchanges (PBX) coupled to T1 or E1 communication links. In such a network, the communication controllers that perform tandem switching are typically required to perform protocol conversion and bandwidth matching between the low speed T1 or E1 links and the high speed asynchronous transfer mode links.

A cell switching communication controller in such a system may be implemented in a modular design that incorporates a set of separate communication modules. Each communication module may, for example, handle communication functions for a subset of the common carrier communication links coupled to the communication controller. Such a communication controller may also include redundant communication modules that provide standby replacements for the active or main communication modules. Such redundant communication modules enable substitution of failed communication modules and reduce the duration of communication interruptions in such a network.

Prior communication controllers typically include a redundant communication module for each main communication module. In such systems, the common carrier communication links for a communication module are typically coupled to Y connectors that route the analog communication signals to both the main communication module and the corresponding redundant communication module. Such Y connectors enable rapid switchover from a main communication module to the corresponding redundant communication module upon detection of a hardware failure in the main communication module.

Unfortunately, such systems having a redundant communication module dedicated to each main communication module typically require a high system cost for providing redundancy. Such systems impose a high cost because only half of the communication modules are active at any given time. In addition, the Y cable connectors employed in such systems typically increase the connectivity cost in such communication controllers. In addition, such a relatively high number of redundant communication modules usually increases the physical size and power consumption of such communication controllers. Such increased size and power consumption increases system costs and limits the placement of such communication controllers at customer sites.

Moreover, the cables and connectors employed in such prior systems decrease the overall available connectivity for such communication controllers. For example, a typical E1 communication link requires a pair of coaxial transmission line connectors for each common carrier link. The cabling and connectors required for each communication link imposes a lower limit on the physical space required to implement such a communication controller even though the communication modules employed therein may otherwise shrink in size as the technology advances.

SUMMARY AND OBJECTS OF THE INVENTION

One object of the present invention is to lower the cost of providing redundancy for a communication controller.

Another object of the present invention is to provide a communication controller with redundancy without the use of Y cable connections on common carrier communication links.

A further object of the present invention is to provide a redundancy mechanism for a communication controller that also enables an increase in the physical connectivity for common carrier communication links.

Another object of the present invention is to provide a redundant communication module that may be substituted for any one of N active communication modules of the same type in the communication controller.

These and other objects are provided by a communication controller having a plurality of communication or service modules including a redundant communication or service module and having a mechanism for substituting the redundant service module for any one of the service modules. The communication controller includes a redundancy module that distributes communication signals from the communication or service modules to the redundant service module. The communication signals for the service modules are received via a set of line modules. Each line module includes a relay controlled and powered by the redundancy module such that each relay couples the corresponding communication links to a common redundancy bus that carries communication signals to the redundant service module. The redundancy module distributes the communication signals to the redundant service module via a distribution bus coupled to the service modules. The distribution bus is alternatively used to distribute data from a high speed communication link to the service modules for improved physical connectivity.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
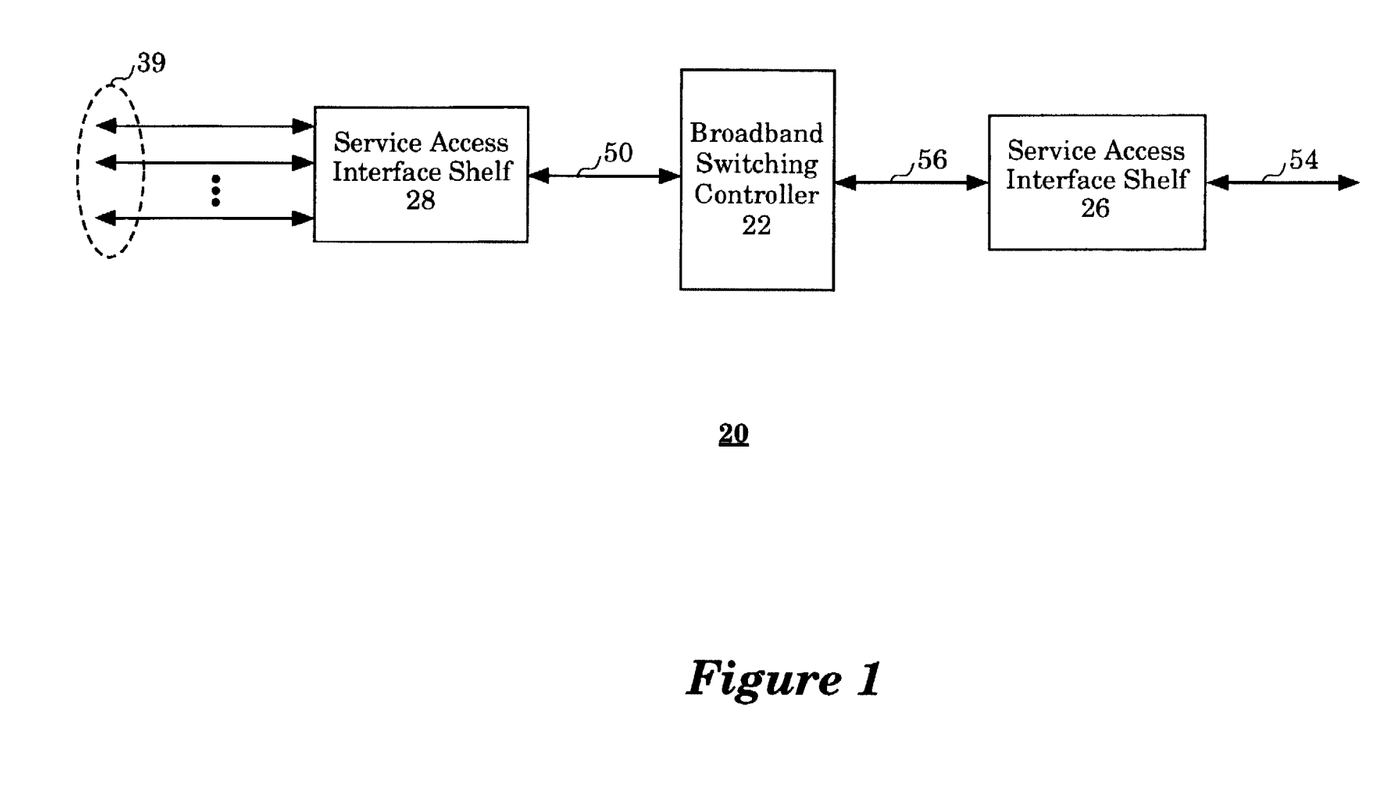
FIG. 1 illustrates a communication network which comprises a set of service access interface shelves and a broadband switching controller that performs high speed tandem cell switching functions via a set of high speed communication links.

FIG. 1 illustrates a communication network 20. The communication network 20 comprises a broadband switching controller 22 that performs high speed tandem cell switching functions via a set of high speed communication links 50 and 56. The broadband switching controller 22 performs high speed tandem switching among the communication links 50 and 56 according to an asynchronous transfer mode communication protocol. For one embodiment, the broadband communication links 50 and 56 each comprise a T3 communication link.

The communication network 20 further comprises a pair of service access interface shelves 26 and 28. Service access interface shelf 28 enables communication between circuit switching communication devices coupled to a set of T1 communication links 39 and the broadband communication controller 22 via the broadband communication link 50.

Service access interface shelf 28 concentrates communication traffic transferred via the low speed communication links 39 onto the high speed communication link 50. Service access interface shelf 28 also converts between the asynchronous transfer mode communication protocol on the high speed communication link 50 and the communication protocols on the low speed communication links 39.

Service access interface shelf 26 receives multiplexed T3 or E3 inputs via communication link 54, which is coupled to service access interface shelf 26.

Service access interface shelf 26 concentrates and transfers onto high speed communication link 56 the communication traffic received on communication link 54.

Service access interface shelves 26 and 28 each implement a one-for-N redundancy mechanism. The one-for-N redundancy mechanism in the interface shelf 28 enables one-for-N substitution of the communication modules coupled to the low speed communication links 39 that perform concentration and conversion functions with respect to the high speed communication link 50. The one-for-N redundancy mechanism in the interface shelf 26 enables the distribution of communication traffic from the communication links 54 to the high speed communication link 56 while decreasing the physical connectivity space required in the interface shelf 26.

Figure 2:
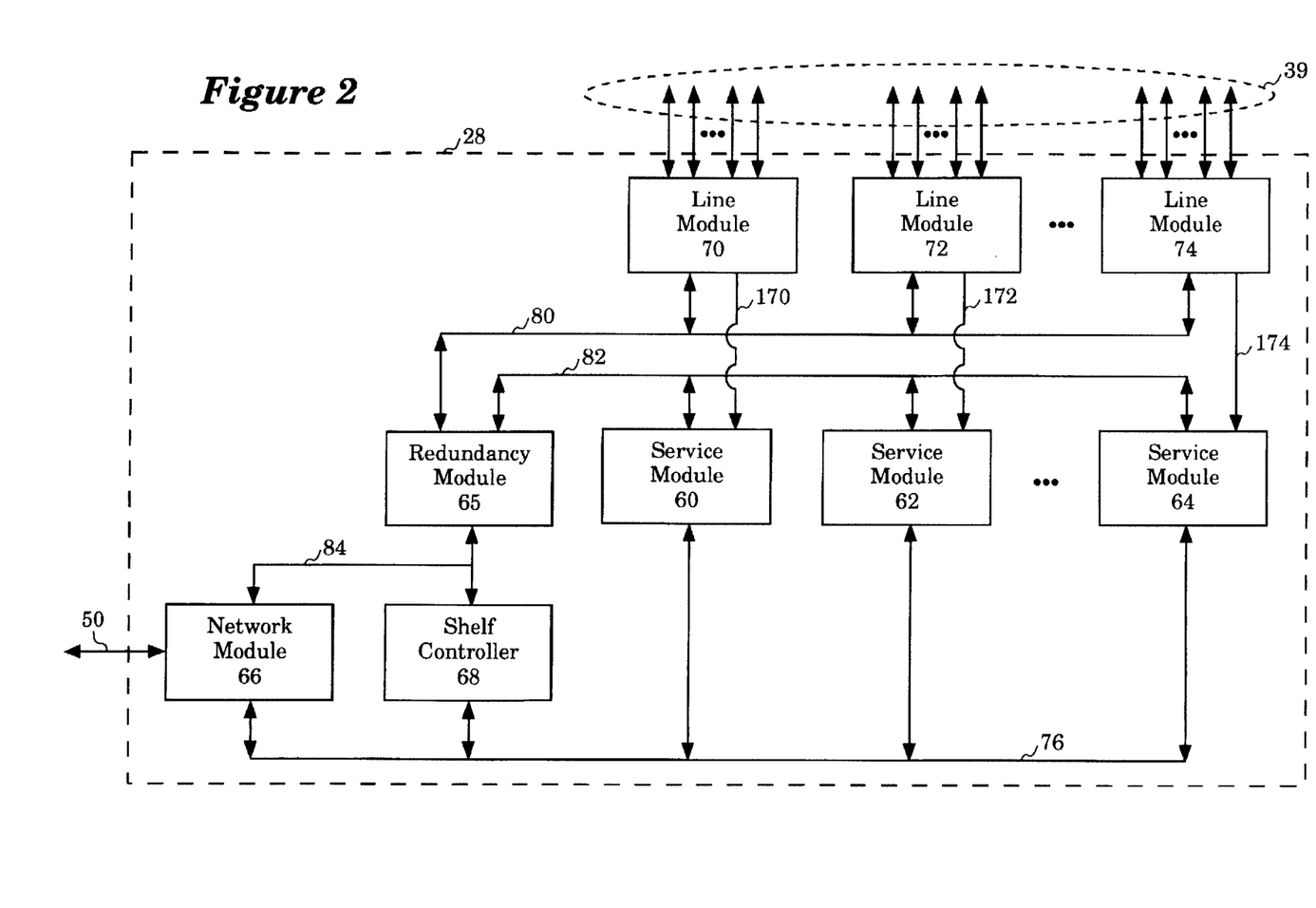
FIG. 2 illustrates an interface shelf which comprises a set of service or communication modules, a corresponding set of line modules, and a redundancy module coupled to a redundancy bus and a set of distribution lines.

FIG. 2 illustrates the interface shelf 28 for one embodiment. The interface shelf 28 comprises a set of service modules 60-64 and a corresponding set of line modules 70-74. The interface shelf 28 further comprises a network module 66 and a shelf controller 68. The network module 66 is coupled as a cell bus master with respect to cell bus 76. The shelf controller 68 and the service modules 60-64 are each coupled as slaves with respect to cell bus 76.

The network module 66 enables communication with the broadband switching controller 22 via the high speed communication link 50 according to an asynchronous transfer mode communication protocol. The network module 66 receives communication cells over the high speed communication link 50 and distributes the communication cells to the service modules 60-64 via the cell bus 76. In addition, the network module 66 receives communication cells from the service modules 60-64 via the cell bus 76. The network module 66 then transfers the communication cells received from the service modules 60-64 to the broadband switching controller 22 via the high speed communication link 50.

The service modules 60-64 enable communication over the low speed communication links 39 through the corresponding line modules 70-74. Each service module 60-64 converts from the communication protocol of the low speed communication links 39 into the asynchronous transfer mode communication protocol of the high speed communication link 50. In addition, each service module 60-64 performs communication cell assembly and disassembly functions during protocol conversion to the asynchronous transfer mode communication protocol.

The line modules 70-74 receive respective analog signals from physical links 39 and pass them as communication signals 170-174 to respective service modules 60-64. For one embodiment, the service modules 60-64 provide up to 10 service modules, wherein each service module enables communication via a set of 4 or 8 corresponding T1 communication links.

The interface shelf 28 further comprises a redundancy module 65. The redundancy module 65 is coupled to each of the line modules 70-74 via a redundancy bus 80. The redundancy bus 80 carries analog signals from the communication links 39 to the redundancy module 65 to bypass any one of the failed service modules 60–64 upon detection of a failure. The redundancy module 65 performs line interface functions for the analog signals transferred via the redundancy bus 80 and distributes the corresponding recovered digital communication signals via a set of distribution lines 82 to any one of the service modules 60–64 designated as the redundant service module for the interface shelf 28. The distribution lines in one embodiment are implemented as point-to-point lines instead of a bus.

Figure 3:
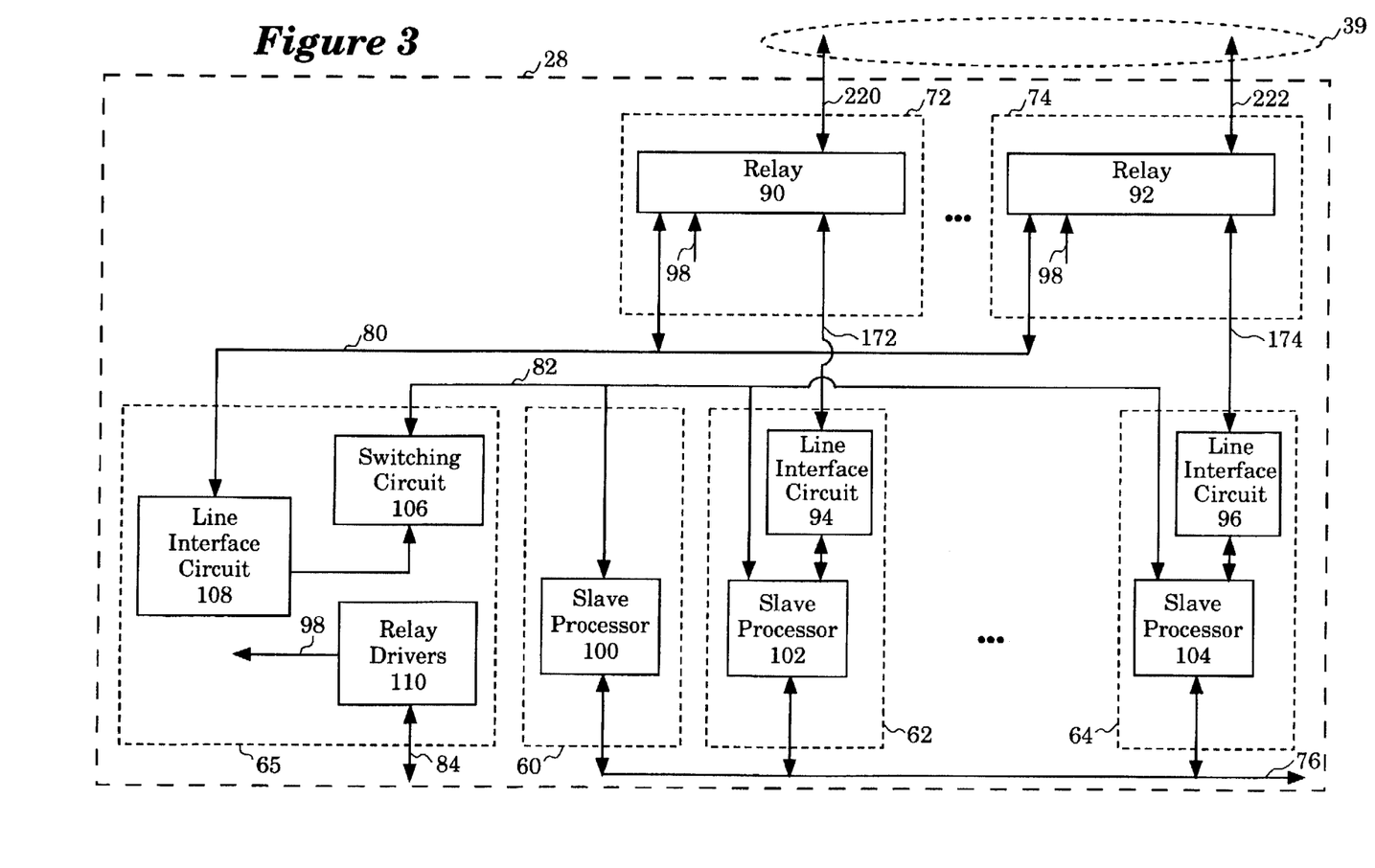
FIG. 3 illustrates the redundancy mechanism of an interface shelf in which one service module is designated as the redundant service module for the interface shelf.

FIG. 3 illustrates the redundancy mechanism of the interface shelf 28 for one embodiment. For this example, the service module 60 is designated as the redundant service module for the interface shelf 28. The service modules 60–64 each contain a corresponding slave processor 100–104. The slave processors 100–104 function as cell bus slaves on the cell bus 76 and enable the transfer of communication cells between the network module 66 and the service modules 60–64.

Each of line modules 70–74 includes a relay to switch the analog signals. For example, line module 72 includes a relay 90 and line module 74 includes a relay 92. These relays in line modules 70–74 are controlled by a set of control signals 98 from a relay driver circuit 110 in the redundancy module 65. Normally, or if the redundancy module 65 is not installed in the interface shelf 28, the control signals 98 inactivate the relays to isolate the corresponding line modules from the redundancy bus 80.

The line interface circuits 94 and 96 perform physical line interface functions for a set of low speed communication links 220 and 222 and transfer corresponding digital communication signals to the slave processors 102 and 104. For one embodiment, the low speed communication links 220 and 222 each comprise a set of four T1 or E1 communication links.

The redundancy module 65 comprises a line interface circuit 108, a switching circuit 106 and the relay drivers 110. The relay drivers 110 are controlled by the shelf controller 68 via a local bus 84.

Upon detection of a failure in one of the service modules 60–64, the shelf controller 68 causes the relay drivers 110 to activate the appropriate relay of relays 90–92. For example, the shelf controller 68 causes the relay drivers 110 to activate the relay 90 upon a failure of the service module 62. Similarly, the shelf controller 68 causes the relay drivers 110 to activate the relay 92 upon detection of a failure of the service module 64.

Thereafter, the activated relay 90 or 92 transfers the corresponding of analog signals from the low speed communication links 39 to the line interface circuit 108 via the redundancy bus 80. For example, the activated relay 90 transfers the analog communication signals of the low speed communication link 220 to the line interface circuit 108. Similarly, the activated relay 92 couples the low speed communication link 220 to the interface circuit 108.

The line interface circuit 108 performs physical line interface functions for the analog signals bussed via the redundancy bus 80. The line interface circuit 108 transfers the resulting digital communication signals to the switching circuit 106. The switching circuit 106 distributes the digital communication signals for the bypassed service module to one of the service modules 60–64 designated as the redundant service module for the interface shelf 28. For this example, switching circuit 106 distributes the digital communication signals to service module 60, which is designated as the redundant service module. The switching circuit 106 distributes the bypassed digital communication signals to the slave processor 100 via the distribution lines 82. As a consequence the service module 60 is effectively substituted for the service module 62 upon activation of the relay 90. Similarly, the service module 60 is effectively substituted for the service module 64 upon activation of the relay 92.

Figure 4:
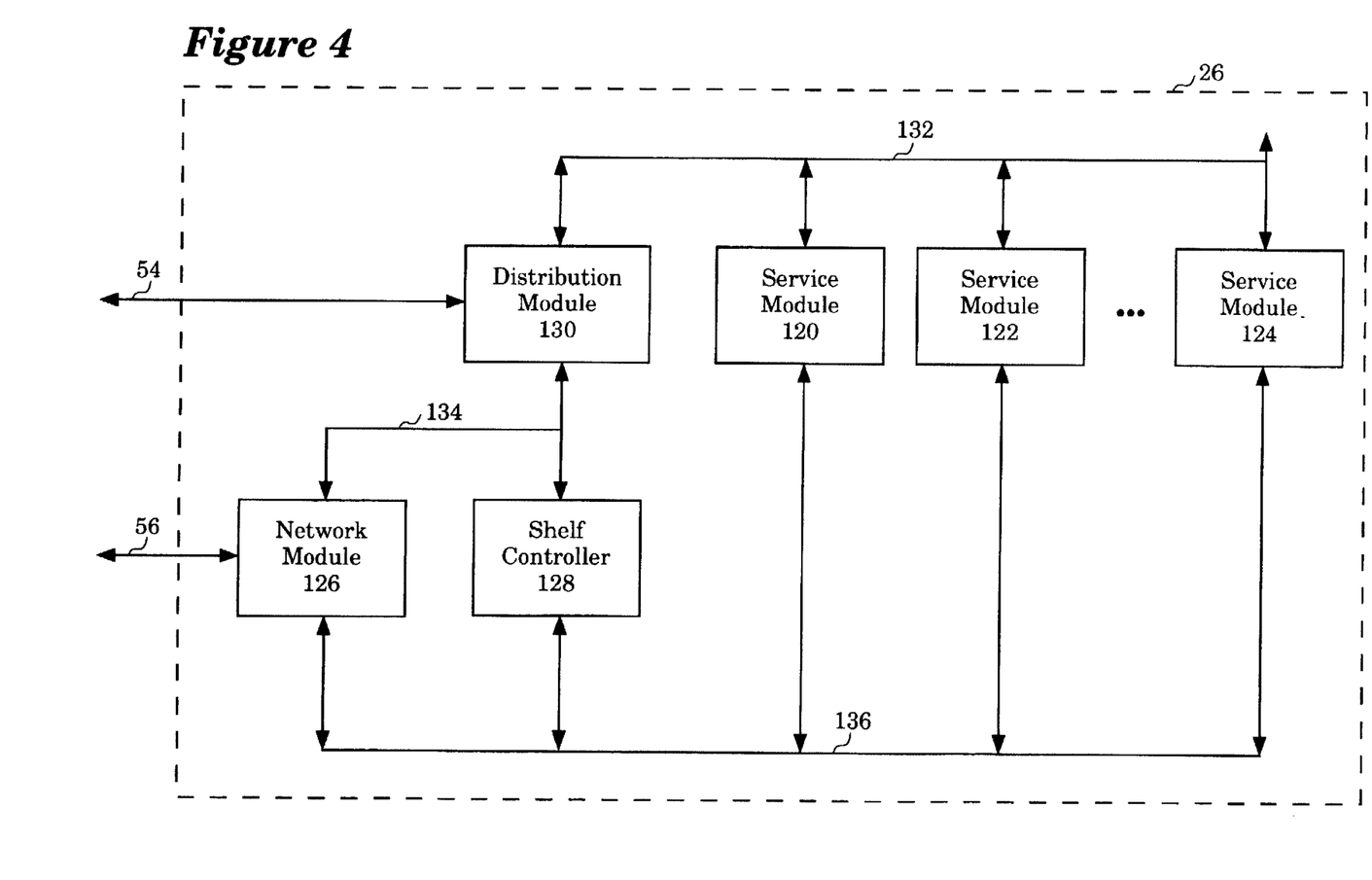
FIG. 4 illustrates an interface shelf which comprises a distribution module and a network module coupled as a cell bus master to a cell bus, and a set of service modules coupled as slaves to the cell bus.

FIG. 4 illustrates the interface shelf 26 for one embodiment. The interface shelf 26 comprises a set of service modules 120–124, a network module 126, and a shelf controller 128. The network module 126 is coupled as a cell bus master to a cell bus 136. The shelf controller 128 and the service modules 120–124 are each coupled as slaves in the cell bus 136.

The network module 126 enables communication with the broadband switching controller 22 via the high speed communication link 56 according to an asynchronous transfer mode communication protocol. The network module 126 receives communication cells over the high speed communication link 56 and distributes the communication cells to the service modules 120–124 via the cell bus 136. The network module 126 receives communication cells from the service modules 120–124 via the cell bus 136. The network module 126 then transfers the communication cells received from the service modules 120–124 to the broadband switching controller 22 via the high speed communication link 56.

Each service module 120–124 converts from the communication protocol of the low speed communication links 39 as transferred via the high speed communication link 56 into the asynchronous transfer mode communication protocol of the high speed communication link 50. In addition, each service module 120–124 performs communication cell assembly and disassembly functions during protocol conversion to the asynchronous transfer mode communication protocol.

The interface shelf 26 further comprises a distribution module 130. The distribution module 130 receives the multiplexed T3 or E3 communication signals from the high speed communication link 54. The distribution module 130 distributes the received communication information to the service modules 120–124 via the distribution lines 132. The distribution module 130 demultiplexes the communication information received over the high speed communication link 54 for distribution to the service modules 120–124. For one embodiment, the distribution module 130 receives communication information over the multiplexed T3 or E3 communication link 54 and demultiplexes the communication information and distributes the demultiplexed communication information digitally to the service modules 120–124.

The service modules 120–124 are identical to the service modules 60–64. The distribution module 130 distributes communication information over the distribution lines 132 such that each of the service modules 120–124 handles the communication capacity equivalent up to 4 or 8 T1 communication links in a manner similar to the service modules 60–64.

Figure 5:
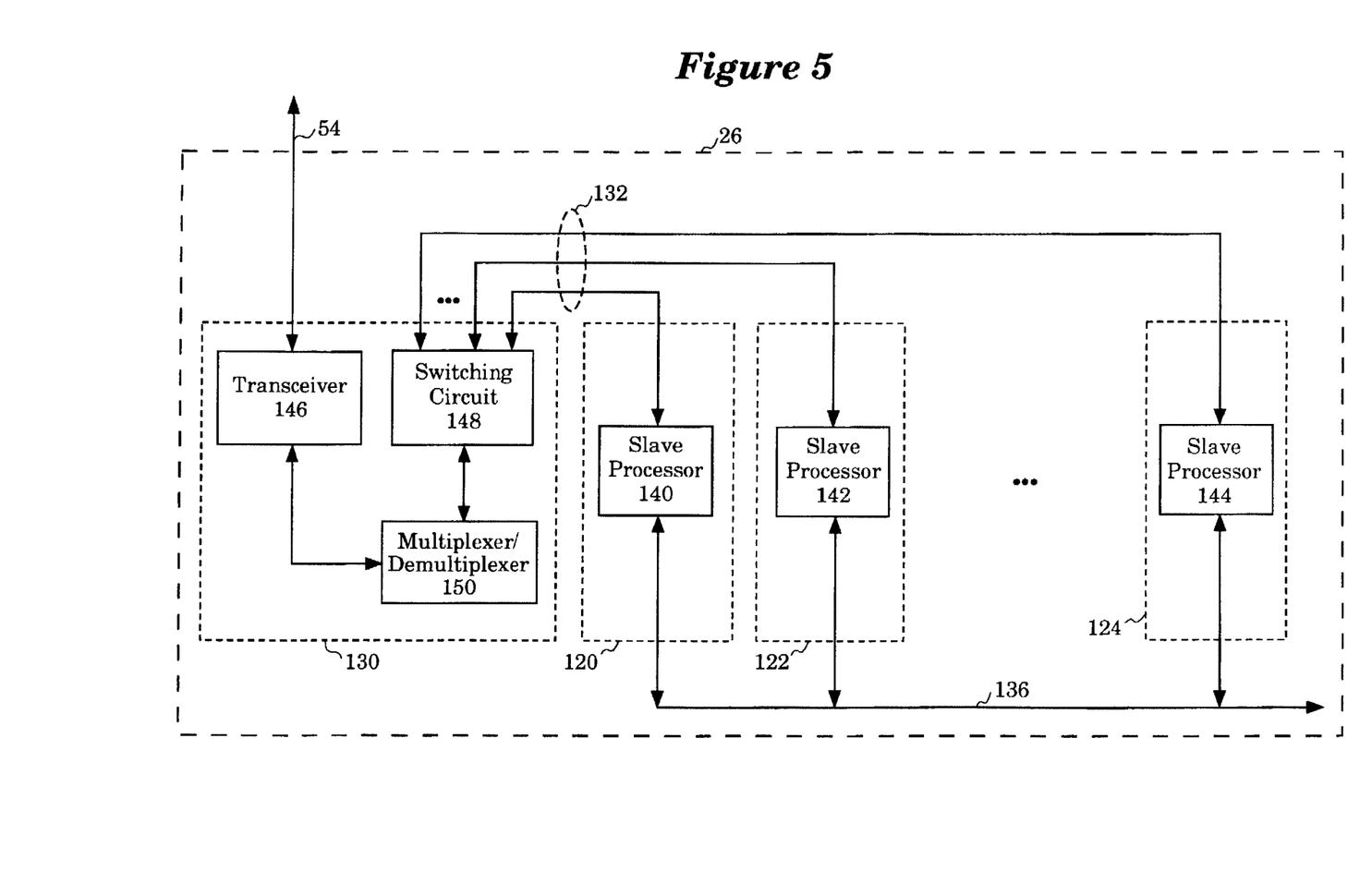
FIG. 5 illustrates the distribution mechanism of an interface shelf which improves physical connectivity of the interface shelf.

FIG. 5 illustrates the distribution mechanism of the interface shelf 26 for one embodiment. The service modules 120–124 each contain corresponding slave processors 140–144. The slave processors 140–144 function as cell bus slaves on the cell bus 136 and enable the transfer of communication cells between the network module 126 and the service modules 120–124.

The distribution module 130 comprises a transceiver 146, a switching circuit 148, and a multiplexer/demultiplexer 150. The transceiver 146 receives communication signals via the high speed communication link 54. The transceiver 146 performs physical line interface functions for the high speed communication link 54 and transfers corresponding digital communication data to the multiplexer/demultiplexer 150.

The multiplexer/demultiplexer 150 demultiplexes the high bandwidth communication data from the transceiver 146 and transfers the demultiplexed data to the switching circuit 148. The switching circuit 148 distributes the demultiplexed communication data to the slave processors 140-144 via the distribution lines 132.

Figure 6:
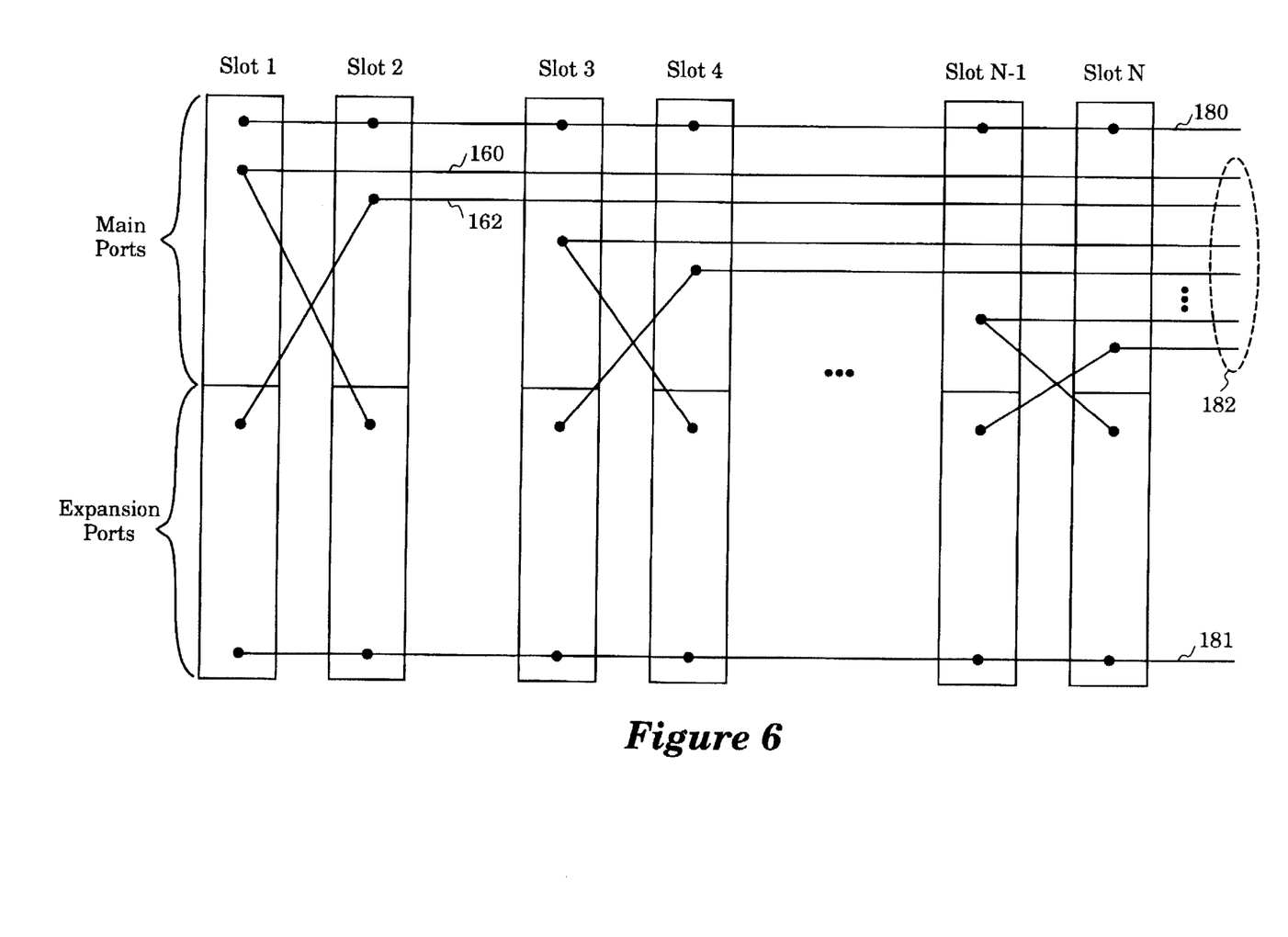
FIG. 6 illustrates a set of mid-plane connectors for the interface shelf which comprise a set of slots that provide a set of main ports and a set of expansion ports.

FIG. 6 illustrates a set of mid-plane connectors for the interface shelf 28 for one embodiment. The mid-plane connectors for the interface shelf 28 comprise a set of slots 1-N. Each of slots 1-N provides a set of main ports and a set of expansion ports. For one embodiment, the main ports of each of slots 1-N provide connectivity for a set of four T1 communication links. In addition, the expansion ports for each of slots 1-N provide connectivity for another set of four T1 communication links for up to 8 T1 links per each slot of slots 1-N and corresponding service module.

Each of the slots 1-N is coupled to a pair of redundancy busses 180 and 181. Each redundancy bus serves substantially the same function as the redundancy bus 80 described above. The redundancy bus 180 corresponds to the main ports of each slot 1-N and the redundancy bus 181 corresponds to the expansion ports of each slot 1-N. Each of the redundancy busses 180 and 181 carries analog signals for up to four T1 communication links according to the activated relays of the line modules for the corresponding slots 1-N.

Each pair of slots of the slots 1-N is coupled to corresponding sets of distribution lines 182. For example, slot 1 and slot 2 are coupled to a set of distribution lines 160 and a set of distribution lines 162. The distribution lines 160 provide distribution line connectivity to the main ports of slot 1 and the expansion ports of slot 2. The distribution lines 162 provide distribution line connectivity to the main ports of slot 2 and the expansion ports of slot 1.

Taken together, the distribution lines 182 provide distribution line connectivity to a redundant service module from the main ports and expansion ports of each of the slots 1-N. The distribution lines 182 provide a digital communication path from the redundancy module to any of the slots 1-N. For this arrangement, any one of the slots 1-N may be employed for a redundant service module. For example, either slot 1 or slot 2 may be employed as a redundant service module. In such an arrangement the remaining slots 2-N are available for active service modules and corresponding line modules.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A communication interface, comprising:

a first service module coupled to receive first communication signals from corresponding first communication links;

a second service module coupled to receive second communication signals from corresponding second communication links; and a redundancy module coupled to said first service module and to said second service module and configured to transfer said first communication signals to said second service module upon a failure of said first service module.

2. A communication interface as in claim 1 wherein said first service module and said second service module are each further configured to convert said first and second communication signals from a first communication protocol to a second communication protocol.

3. A communication interface as in claim 2 further comprising:

a first line module coupled to said first service module and to said redundancy module, said first line module configured to receive said first communication signals from said first communication links and to provide said first communication signals to said first service module; and a second line module coupled to said second service module and to said redundancy module, said second line module configured to receive said second communication signals from said second communication links and to provide said second communication signals to said second service modules.

4. A communication interface as in claim 3 wherein said first and second service modules each further comprise means for concentrating output signals representing said first and second communication signals in said second communication protocol onto a cell bus coupled to said first and second service modules.

5. A communication interface as in claim 4 further comprising a network module coupled to receive said output signals from said cell bus and to transmit said output signals on a third communication link according to said second communication protocol.

6. A communication interface as in claim 5 wherein said redundancy module is further configured to perform interface line functions for said first and second communication signals and to convert said first and second communication signals to digital communication signals according to said second communication protocol.

7. A communication interface as in claim 6 further comprising a controller coupled to said redundancy module and configured to cause said first line module to route said first communication signals to said redundancy module upon said failure of said first service module.

8. A communication interface, comprising:

a plurality of line modules each configured to receive analog communication signals according to a first communication protocol over one or more corresponding low speed communication links;

a plurality of service modules each coupled to receive said analog communication signals from a corresponding one of said line modules, to convert said analog communication signals to digital communication signals according to a second communication protocol and to concentrate said digital communication signals onto a first bus;

a network module coupled to receive said digital communication signals from said first bus and configured to transmit said digital signals over a high speed communication link according to said second communication protocol;

a redundancy module coupled to each of said line modules through a redundancy bus configured to carry said analog signals from said line modules to said redundancy module to bypass any one of said service modules upon detection of a failure, said redundancy module configured to perform interface line functions for said analog signals transferred via said redundancy bus and to distribute corresponding digital signals according to said second communication protocol to any of said service modules designated as a redundant service module for said communication interface via a set of distribution lines coupling said redundancy module to each of said service modules; and a controller coupled to said redundancy module, said network module and said first bus, and configured to cause a first of said line modules to route analog signals received over one or more of said low speed communication links corresponding to said first line module to said redundancy module upon detection of a failure of a first of said service modules corresponding to said first line module.

9. A communication interface as in claim 8 wherein said second communication protocol is asynchronous transfer mode.

10. A communication interface as in claim 9 wherein said distribution lines comprise point-to-point links.

11. A communication interface as in claim 10 wherein each of said service modules further comprise a slave processor configured to function as bus slaves on said first bus.

12. A communication interface as in claim 11 wherein said network module is further configured as a bus master on said first bus.

13. A communication interface as in claim 12 wherein each of said line modules further comprise a relay configured to respond to control signals from said redundancy module.

14. A communication interface as in claim 13 wherein said control signals are generated in response to a signal from said controller.

* * * * *